US010181609B2

(12) United States Patent
Eickhoff et al.

(10) Patent No.: US 10,181,609 B2
(45) Date of Patent: Jan. 15, 2019

(54) POWER SOURCE WITH WIRELESS CAPABILITY

(71) Applicant: Honeywell International Inc., Morris Plains, NJ (US)

(72) Inventors: Steven J. Eickhoff, Brooklyn Park, MN (US); John Price, Herndon, VA (US); Christian Larson, Golden Valley, MN (US); Jeffrey Michael Klein, Minneapolis, MN (US); Alan Cornett, Andover, MN (US)

(73) Assignee: Honeywell International Inc., Morris Plains, NJ (US)

( * ) Notice: Subject to any disclaimer, the term of this patent is extended or adjusted under 35 U.S.C. 154(b) by 83 days.

(21) Appl. No.: 15/406,984

(22) Filed: Jan. 16, 2017

(65) Prior Publication Data

US 2018/0205103 A1    Jul. 19, 2018

(51) Int. Cl.
*H01M 8/02* (2016.01)
*H01M 8/04082* (2016.01)
*H01M 8/00* (2016.01)
*H01M 8/04537* (2016.01)
*H01M 16/00* (2006.01)
*H01G 11/08* (2013.01)
*H01M 8/065* (2016.01)
*H01M 10/42* (2006.01)
*H01M 8/1018* (2016.01)

(52) U.S. Cl.
CPC ........ *H01M 8/04216* (2013.01); *H01G 11/08* (2013.01); *H01M 8/004* (2013.01); *H01M 8/04552* (2013.01); *H01M 8/065* (2013.01); *H01M 10/425* (2013.01); *H01M 16/003* (2013.01); *H01M 16/006* (2013.01); *H01M 2008/1095* (2013.01); *H01M 2220/30* (2013.01); *H01M 2250/30* (2013.01)

(58) Field of Classification Search
None
See application file for complete search history.

(56) References Cited

U.S. PATENT DOCUMENTS

2008/0160383 A1\* 7/2008 Shen ................. H01M 8/04007
429/440

\* cited by examiner

*Primary Examiner* — Jacob B Marks
(74) *Attorney, Agent, or Firm* — Schwegman, Lundberg & Woessner, P.A.

(57) ABSTRACT

A power source includes a container, a hydrogen fuel disposed within the container, a fuel cell wrapped around the hydrogen fuel within the container, electronics supported within the container and coupled to receive current from the fuel cell, a sensor coupled to the electronics to provide data representative of a sensed condition, and a charge storage device within the container and coupled to provide current to the electronics.

15 Claims, 13 Drawing Sheets

POWER SOURCE WITH WIRELESS CAPABILITY

BACKGROUND

The performance and lifetime of many portable/wireless devices are limited by the capacity of their power sources. Information about the power source of a wireless device can be obtained by physically access the device. However, in some situations, it may be difficult to obtain physical access to the device.

SUMMARY

A power source includes a container, a hydrogen fuel disposed within the container, a fuel cell wrapped around the hydrogen fuel within the container, electronics supported within the container and coupled to receive current from the fuel cell, a sensor coupled to the electronics to provide data representative of a sensed condition, and a charge storage device within the container and coupled to provide current to the electronics.

A power source includes a container having a cathode and an anode. A hydrogen fuel is disposed within the container. A fuel cell is wrapped around the hydrogen fuel within the container wherein the fuel cell is coupled to the cathode and anode. A controller is supported within the container and coupled to receive current from the fuel cell. A sensor is coupled to the electronics to provide data representative of a sensed condition. A wireless transmitter is coupled to the controller to transmit the data. A charge storage device within the container is coupled to provide current to the controller and transmitter.

A method includes receiving electrical current at electronics integrated into a power source container, the current generated substantially via a fuel cell receiving hydrogen from a chemical hydride within the power source container, receiving data from at least one sensor representative of a voltage produced by the fuel cell, storing excess hydrogen generated from the chemical hydride in a metal hydride within the power source container, receiving electrical current from the fuel cell that receive hydrogen from the metal hydride when a current demand exceeds a level sustainable by hydrogen from the chemical hydride, and receiving electrical current from a charge storage device within the power source container when a current demand exceeds a level sustainable by hydrogen from the chemical hydride and metal hydride.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

In various embodiments, a high capacity power source with embedded sensing and/or wireless capability is capable of operating as a power source within a device while sensing and providing wirelessly, information about the power source, device, or local environment to another remote device.

Similar to batteries, fuel cells function to produce electricity through chemical reactions. Rather than storing reactants as batteries do, fuel cells are operated by continuously supplying reactants to the cell. In a typical fuel cell, hydrogen gas acts as one reactant and oxygen as the other, with the two reacting at electrodes to form water molecules and releasing energy in the form of direct current electricity. The apparatus and process may produce electricity continuously as long as hydrogen and oxygen are provided. While oxygen may either be stored or provided from the air, hydrogen gas may be generated from other compounds through controlled chemical reactions rather than storing hydrogen, which may need to be compressed or cryogenically cooled. As fuel cell technology evolves, so do the means by which hydrogen gas is generated for application with fuel cells.

Figure 1:
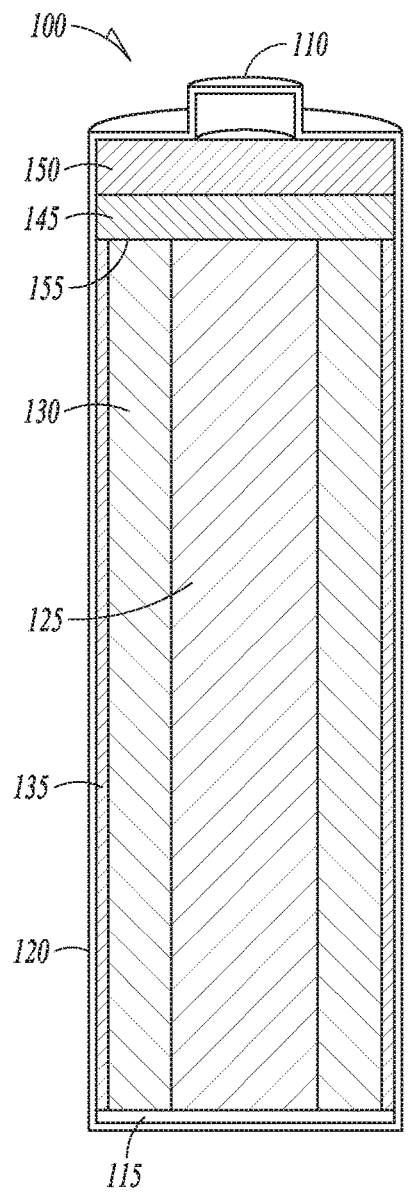
FIG. 1 is a block perspective cut away diagram of a fuel cell based power source according to an example embodiment.
Figure 2:
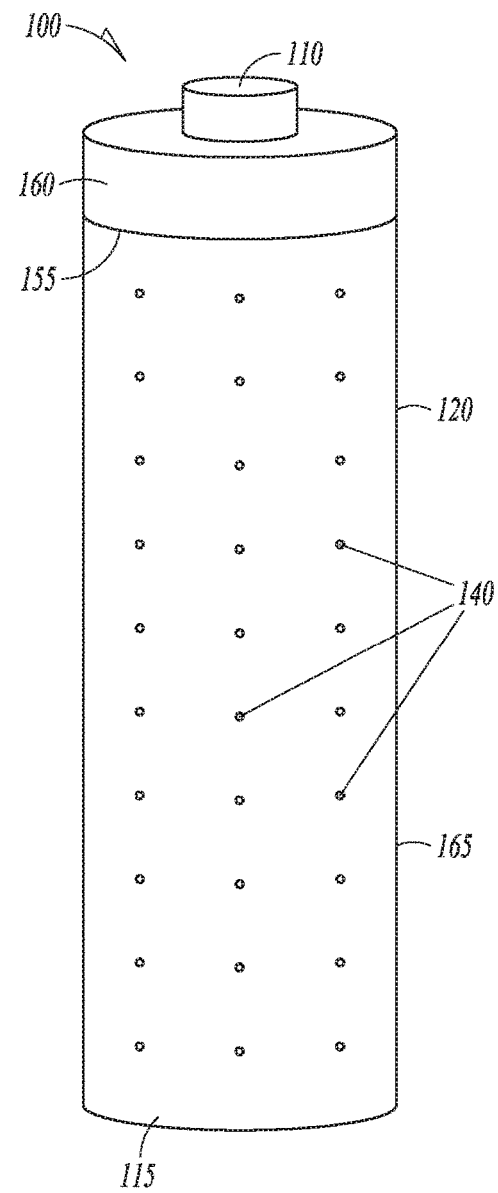
FIG. 2 is a block perspective view of the fuel cell based power source of FIG. 1.

FIG. 1 is a block perspective cut away diagram of a fuel cell based power source shown generally at 100. FIG. 2 is a block perspective view of the fuel cell based power source 100. The power source 100 includes a positive electrical terminal 110 and a negative electrical terminal 115. An outer case 120 of the power source 100 is generally cylindrical in form and may have a form factor the same as a standard AA battery in one embodiment. The form factor may vary in further embodiments and may also take the shape of different standard battery types, such as AAA, C. D, 9V, and other shapes, sharing the same form factor, size, weight, and interfaces to devices. Fuel cell based power source 100 may provide three to four times longer useable life than comparably packaged alkaline and lithium batteries and have broader operating temperature range.

In one embodiment, the power source 100 includes one or more types of hydrogen generating fuels, such as a metal hydride indicated at 125 and a chemical hydride indicated at 130. The arrangement of the respective fuels may be as shown, with the metal hydride forming a cylinder and the chemical hydride surrounding the cylinder in some embodiments. Many other types of arrangements of the fuels, such as segregated or mixed fuel types, may be utilized as described in further detail below. The fuels 125 and 130 may be high energy hydrides having a high energy density and broad temperature range, such as −25° C. to 85° C., and operate at high altitudes such as up to about 35.000 feet. Fuel cell 135 may be wrapped around the fuel or fuels in one embodiment. Controlling the amount of water vapor provided to the fuels results in control of the amount of hydrogen produced and hence the amount of electricity provided by the fuel cell or cells.

In one embodiment, the perforations 140 comprise pinholes that limit the amount of water vapor provided to the power generator from ambient atmosphere, which may have an added benefit of reducing the power source operating pressure under hot and humid conditions, as less water reaches the fuel, limiting over production of hydrogen from the fuel. Water vapor produced by the chemical reaction of the hydrogen and oxygen at a fuel cell proton exchange membrane electrode assembly is provided back to the fuel and is sufficient to keep the power source generating the design point average power.

The perforations 140 are coupled to ambient atmosphere to obtain exposure to oxygen and water vapor and wherein the oxygen limiting pinholes restrict water vapor recovered from ambient atmosphere such that oxygen may be the primary regulator of electricity generated by the fuel cell proton exchange membrane. The oxygen limiting perforations 140 may be configured in one embodiment to regulate oxygen provided to the a cathode of the fuel cell proton exchange membrane electrode assembly to control electricity generated without regulation of water vapor. By placing the perforations adjacent the first gas diffusion layer and the cathode side of the fuel cell proton exchange membrane electrode assembly, a very short diffusion path for oxygen is provided. This may also allow the fuel cell portion of the power generator to be made fairly thin, since additional paths for flow of oxygen, water vapor, or hydrogen may be reduced or eliminated.

In one embodiment, a charge storage area 145 is provided for pulsed loads, which are loads that are beyond the capabilities of being produced by the fuel cell 135. Examples of charge storage area 145 include super capacitors, lithium-ion capacitors, or rechargeable batteries, which may be charged over time from the fuel cell or cells.

Electronics 150 may be provided to manage power, provide wireless communication capabilities such as radio, Zigbee, WiFi, UHF, L-band, or Bluetooth, or other wireless communication mechanism, and sense one or more parameters that may be representative of the environment, characteristics of the device in which the power source is embedded, and remaining charge of the power source. The electronics in one embodiment may mimic the electrical characteristics of a battery having a same form factor, such as the voltage, impedance, and internal resistance of a AA alkaline or lithium battery.

In some embodiments, the electronics 150 and optionally the charge storage 145 may be reuseable by replacing the hydrogen generating fuel or fuels, or even an entire fuel cell assembly that includes the fuel cell 135, case 120, and fuels 125 and 130, the fuel cell assembly in one embodiment may be positioned below and detach such as by threaded engagement represented at 155 with a top portion 160 of the power source 100, which may contain the electronics 150 and optionally the charge storage 145. A replaceable bottom portion is shown at 165. Mechanisms other than engaging threads to attach and detach the top and bottom portions may be used in further embodiments, such as friction fitting sleeves and engageable snap fit elements.

Figure 3:
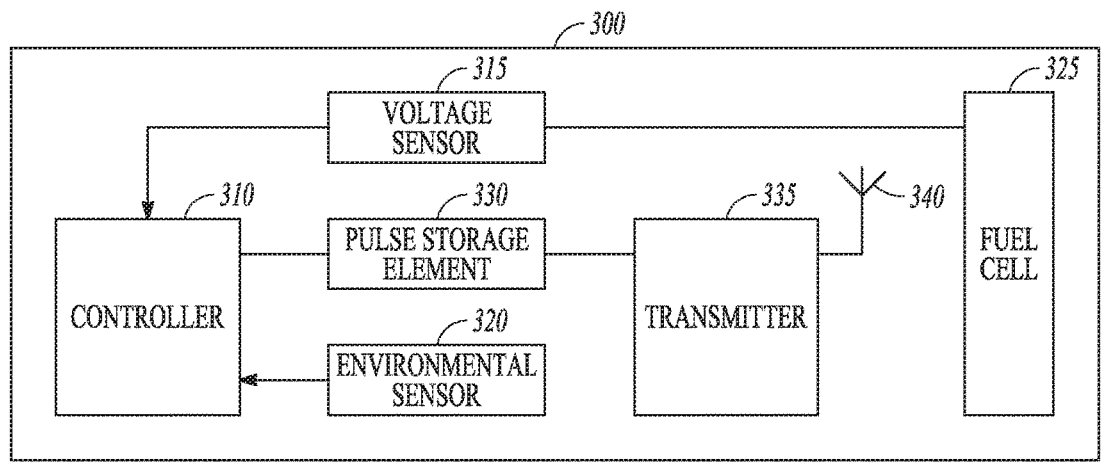
FIG. 3 is a block schematic diagram of electronics for a fuel cell based power source according to an example embodiment.

FIG. 3 is a block diagram of electronics 300 suitable for use in the power source 100. In one embodiment, a controller 310 may be programmed to receive data from one or more sensors, such as a voltage sensor 315 and one or more environmental sensors 320. The electronics and sensors may receive power from a connection to the fuel cell as indicated at 325. As indicated above, the fuel cell may be separate from and not part of the electronics 300 in one embodiment to allow ease of replacement. Power from the pulse storage element is indicated at 330, and may be coupled to the controller 310 and a transmitter 335 and antenna 340. In one embodiment, the controller provides data from the sensors to the transmitter for wireless transmission. The transmitter 335 may utilize a pulse of current that is beyond the capabilities of the fuel cell to provide instantaneously, so power for the transmission may be drawn from the pulse storage element 330.

The information provided by controller 310 may include but is not limited to battery capacity information, power consumption, fault conditions, local environmental sensed parameters such as temperature, relative humidity, pressure, vibration and others, or information about the device in which the power source is embedded. In further embodiments, the controller may include location sensing capabilities, such as global positioning sensing, velocity, acceleration, and rotation sensing, which may be useful for unmanned air vehicles and even consumer devices, such as a television or other device remote control.

Figure 4:
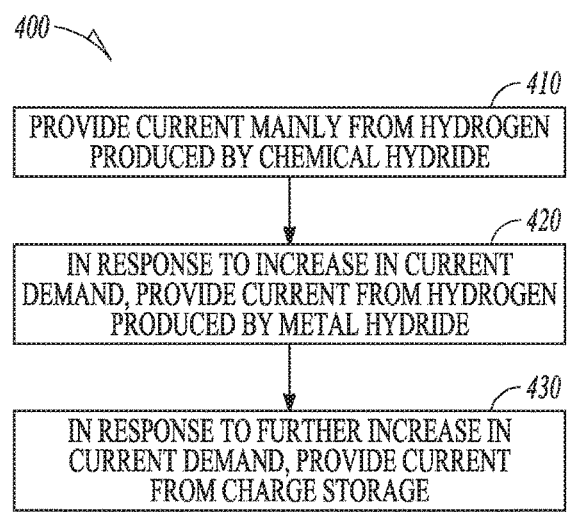
FIG. 4 is a flowchart describing a method of providing current using a fuel cell based source with electronics and electric charge storage according to an example embodiment.

FIG. 4 is a flowchart describing a method 400 of providing current using the power source 100. At 410, the power source 100 provides current based on hydrogen produced mainly by the chemical hydride fuel 130. The current provides power for the controller of the electronics in a lower power mode, such as sleep mode. The sensors may or may not be powered from such current in various embodiments, or selected sensors may be powered. At 420, further power may be required, such as when the controller wakes up periodically and processes signals from the sensors. Current may then be provided by the metal hydride, which was being recharged from the chemical hydride at 410.

When transmission of data is performed by the electronics, even higher current levels may be provided at 430 with the addition of current from the charge storage 145. The controller 310 may set switches responsive to the various levels of current demand to implement method 400.

In a further embodiment, the power source 100 may perform a method that includes receiving electrical current at the electronics 150 which may be integrated into the power source container 120. The current may be generated substantially via the fuel cell 135 receiving hydrogen from the chemical hydride 130 within the power source container 120. Excess hydrogen generated from the chemical hydride may be stored in the metal hydride 125 within the power source container 120.

In one embodiment, electrical current is received from the fuel cell 135 that receives hydrogen from the metal hydride 125 when a current demand exceeds a level sustainable by hydrogen from the chemical hydride 130. Electrical current may also be received from the charge storage device 145 within the power source container 120 when a current demand exceeds a level sustainable by hydrogen from the chemical hydride 130 and metal hydride 125. This may occur when data is wirelessly transmitted, or may be caused by current needs of an external load that draws current from the cathode 110 and anode 115. Additional current may also be drawn when a processor used to implement the controller 310 transitions from a sleep mode to an awake mode to process data. In the sleep mode, the controller 310 may simply be performing calculations to determine when to periodically wake up.

In one embodiment, the hydrogen producing fuel may be in the form of a fuel pellet that includes a chemical hydride, metal hydride, and a selectively permeable membrane. The chemical hydride portion of the fuel pellet may be segmented into a number of parts with gas spaces in between to facilitate transport of water vapor and hydrogen. In one embodiment, the chemical hydride evolves hydrogen spontaneously upon exposure to water vapor, and the metal hydride reversibly adsorbs/desorbs hydrogen based on temperature and hydrogen pressure.

In various embodiments, the chemical hydride of the fuel pellet provides a large store of releasable hydrogen for a fuel cell, and the metal hydride provides higher levels of hydrogen for pulse intervals of higher demand to supplement the pulse current provided by the charge storage 145. The selectively permeable membrane may be a liquid water impermeable and hydrogen and water vapor permeable membrane. The membrane may also provide some containment to help the fuel pellet keep a desired shape, and also to prevent fuel particles from leaving the pellet and contaminating the power generator. Desired shapes include those suitable for existing and future common form factor batteries. In further embodiments, the fuel pellet may be fissurized to further facilitate water vapor and hydrogen transport.

Figure 5:
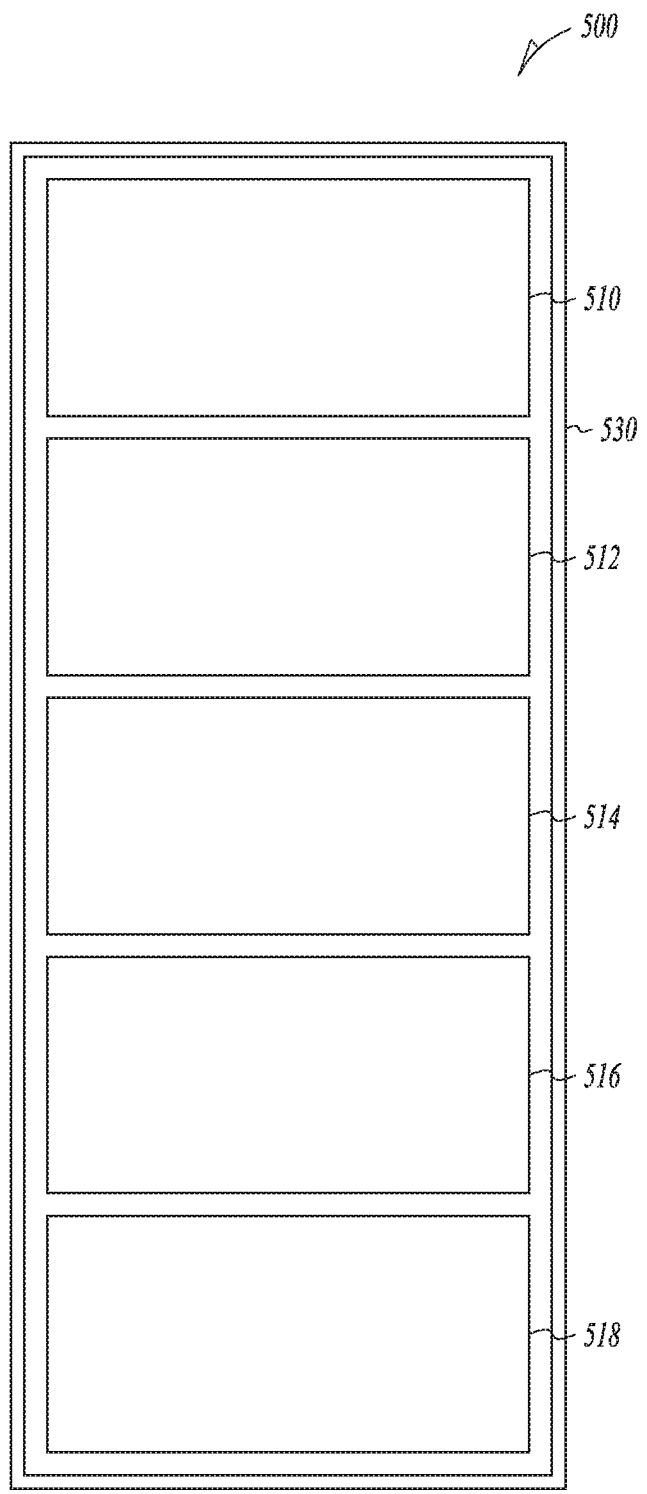
FIG. 5 is a cross section representation of a fuel pellet according to an example embodiment.

FIG. 5 illustrates a fuel pellet 500 that includes multiple segments 510, 512, 514, 516, and 518. The fuel pellet 500 may be formed of a non-fluid, hygroscopic, porous material. Such a pellet may be useful in hydrogen gas generating power generators that incorporate one or more fuel cells. A power generator may include a fuel chamber within a generator housing that holds the fuel, which may be encapsulated or wrapped in a water impermeable, hydrogen and water vapor permeable material 530. Reaction of the fuel with water vapor produces hydrogen gas that is used by the at least one fuel cell to generate electricity.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X. Y, or about Z" has the same meaning as "about X, about Y. or about Z." unless indicated otherwise.

The term "about" as used herein can allow for a degree of variability in a value or range, for example, within 10%, within 5%, or within 1% of a stated value or of a stated limit of a range, and includes the exact stated value or range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

In one embodiment, the fuel, referred to as a hydrogen-generating composition, can include a hydride and a Lewis acid. The hydrogen-generating composition can be combined with water to generate hydrogen gas. The phase of the water contacted with the hydrogen-generating composition to generate the hydrogen gas can be any suitable phase, such as liquid water (e.g., in a pure state, diluted state, or such as having one or more compounds or solvents dissolved therein) or gaseous water (e.g., water vapor, at any suitable concentration). The generated hydrogen gas can be used as the fuel for a hydrogen-consuming fuel cell.

The hydrogen-generating composition can be in any suitable form. The hydrogen-generating composition can be in the form of a loose powder, or a compressed powder. The hydrogen-generating composition can be in the form of grains or pellets (e.g., a powder or grains compressed into pellets). The hydrogen-generating composition can have any suitable density, such as about 0.5 g/cm$^3$ to about 1.5 g/cm$^3$, or about 0.5 g/cm$^3$ or less, or less than, equal to, or greater than about 0.6 g/cm$^3$, 0.7, 0.8, 0.9, 1, 1.1, 1.2, 1.3, 1.4 g/cm$^3$, or about 1.5 g/cm$^3$ or more.

In some embodiments, when contacted with water the hydrogen-generating composition forms fewer (e.g., a smaller mass per mass of hydrogen formed) non-hydrogen materials as compared to a corresponding hydrogen-generating composition including less or none of the Lewis acid. The non-hydrogen materials that are formed less or not at all during hydrogen production can be hydrates (e.g., hydrated hydroxides) of the hydride in the hydrogen-generating composition. By avoiding production of unwanted (e.g., non-hydrogen) materials during hydrogen generation, the amount of hydrogen that can be produced per mass of the hydrogen-generating composition can be greater than that of a corresponding hydrogen-generating composition including less or none of the Lewis acid or less or none of the metal oxide.

In some embodiments, when contacted with water the hydrogen-generating composition forms hydrogen gas at a higher rate as compared to a corresponding hydrogen-generating composition including less or none of the Lewis acid. For example, a given mass of the hydrogen-generating composition can form a given number of moles of hydrogen gas in less time when contacted with a given mass of water as compared to the amount of time required for the same mass of a corresponding hydrogen-generating composition, including less or none or the Lewis acid or including less or none of the metal oxide, contacted with the same mass of water to produce the same number of moles of hydrogen gas. The rate of hydrogen generation of embodiments of the hydrogen-generating composition can exceed the rate of a corresponding hydrogen-generating composition including less or none or the Lewis acid or including less or none of the metal oxide by any suitable amount; for example, the rate can be greater than 1 times greater to equal to or less than about 20 times greater as compared to a corresponding hydrogen-generating composition including less or none of the Lewis acid, or about 2.5 to about 7.5 times greater, or about 2 times greater or less, or less than, equal to, or greater than about 2.5 times greater, 3, 3.5, 4, 4.5, 5, 5.5, 6, 6.5, 7, 7.5, 8, 9, 10, 11, 12, 13, 14, 15, 16, 18, or about 20 or more times greater.

In some embodiments, the hydrogen-generating composition is substantially free of elemental metals. In some embodiments, the hydrogen-generating composition can be substantially free of elemental aluminum.

Hydride.

The hydrogen-generating composition includes one or more hydrides. The one or more hydrides can form any suitable proportion of the hydrogen-generating composition, such as about 50 wt % to about 99.999 wt %, about 70 wt % to about 99.9 wt %, about 70 wt % to about 90 wt %, or about 50 wt % or less, or less than, equal to, or greater than about 52 wt %, 54, 56, 58, 60, 62, 64, 66, 68, 70, 71, 72, 73, 74, 75, 76, 77, 78, 79, 80, 81, 82, 83, 84, 85, 86, 87, 88, 89, 90, 92, 94, 96, 98, 99, 99.9, 99.99, or about 99.999 wt % or more.

The hydride can be any suitable hydride, such that the hydrogen-generating composition can be used as described herein. The hydride can be a compound in which one or more hydrogen centers (e.g., one or more hydrogen atoms, or a group that includes one or more hydrogen atoms) having nucleophilic, reducing, or basic properties. The hydrogen atom in the hydride can be bonded to a more electropositive element or group. For example, the hydrogen can be chosen from an ionic hydride (e.g., a hydrogen atom bound to an electropositive metal, such as an alkali metal or alkaline earth metal), a covalent hydride (e.g., compounds including covalently bonded hydrogen and that react as hydride, such that the hydrogen atom or hydrogen center has nucleophilic properties, reducing properties, basic properties, or a combination thereof), a metallic hydride (e.g., interstitial hydrides that exist within metals or alloys), a transition metal hydride complex (e.g., including compounds that can be classified as covalent hydrides or interstitial hydrides, such as including a single bond between the hydrogen atom and a transition metal), or a combination thereof.

The hydride can be chosen from magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof. The hydride can be chosen from lithium aluminum hydride ($LiAlH_4$), calcium hydride ($CaH_2$), sodium aluminum hydride ($NaAlH_4$), aluminum hydride ($AlH_3$), and a combination thereof. The hydride can be lithium aluminum hydride ($LiAlH_4$).

In some embodiments, the hydrogen-generating composition only includes a single hydride and is substantially free of other hydrides. In some embodiments, the hydrogen-generating composition only includes one or more hydrides chosen from lithium aluminum hydride ($LiAlH_4$), calcium hydride ($CaH_2$), sodium aluminum hydride ($NaAlH_4$), and aluminum hydride ($AlH_3$), and is substantially free of other hydrides. In some embodiments, the hydrogen-generating composition only includes the hydride lithium aluminum hydride ($LiAlH_4$), and is substantially free of other hydrides. In some embodiments, the hydrogen-generating composition can be substantially free of simple hydrides that are a metal atom directly bound to a hydrogen atom. In some embodiments, the hydrogen-generating composition can be substantially free of lithium hydride and beryllium hydride.

In some embodiments, the hydrogen-generating composition can be substantially free of hydrides of aluminum (Al), arsenic (As), boron (B), barium (Ba), beryllium (Be), calcium (Ca), cadmium (Cd), cerium (Ce), cesium (Cs), copper (Cu), europium (Eu), iron (Fe), gallium (Ga), gadolinium (Gd), germanium (Ge), hafnium (Hf), mercury (Hg), indium (In), potassium (K), lanthanum (La), lithium (Li), magnesium (Mg), manganese (Mn), sodium (Na), neodymium (Nd), nickel (Ni), lead (Pb), praseodymium (Pr), rubidium (Rb), antimony (Sb), scandium (Sc), selenium (Se), silicon (Si), samarium (Sm), tin (Sn), strontium (Sr), thorium (Th), titanium (Ti), thallium (Tl), vanadium (V), tungsten (W), yttrium (Y), ytterbium (Yb), zinc (Zn), zirconium (Zr), hydrides of organic cations including ($CH_3$) methyl groups, or a combination thereof. In various embodiments, the hydrogen-generating composition can be substantially free of one or more of lithium hydride (LiH), sodium hydride (NaH), potassium hydride (KH), magnesium hydride ($MgH_2$), calcium hydride ($CaH_2$), lithium aluminum hydride ($LiAlH_4$), sodium borohydride ($NaBH_4$), lithium borohydride ($LiBH_4$), magnesium borohydride $Mg(BH_4)_2$, sodium aluminum hydride ($NaAlH_4$), or mixtures thereof.

In some embodiments, the hydrogen-generating composition includes a metal hydride (e.g., an interstitial intermetallic hydride). Metal hydrides can reversibly absorb hydrogen into their metal lattice. The metal hydride can be any suitable metal hydride. The metal hydride can be $LaNi_5$, $LaNi_{4.6}Mn_{0.4}$, $MnNi_{3.5}Co_{0.7}Al_{0.5}$, $MnNi_{4.2}Co_{0.2}Mn_{0.3}Al_{0.3}$, $TiFe_{0.5}Ni_{0.2}$, $CaNi_5$, $(V_{0.9}Ti_{0.1})_{0.95}Fe_{0.05}$, $(V_{0.9}Ti_{0.1})_{0.95}Fe_{0.05}$, $LaNi_{4.7}Al_{0.3}$. $LaNi_{5-x}Al_x$ wherein x is about 0 to about 1, or any combination thereof. The metal hydride can be $LaNi_{5-x}Al_x$ wherein x is about 0 to about 1 (e.g., from $LaNi_5$ to $LaNi_4Al$). The metal hydride can form any suitable proportion of the hydrogen-generating composition, such as about 10 wt % to about 99.999 wt %, or about 20 wt % to about 99.5 wt %, or about 10 wt % or less, or less than, equal to, or greater than about 15 wt %, 20, 21, 22, 23, 24, 25, 26, 27, 28, 29, 30, 35, 40, 45, 50, 55, 60, 65, 70, 75, 80, 85, 90, 91, 92, 93, 94, 95, 96, 97, 98, 99, 99.5, 99.9, 99.99, or about 99.999 wt % or more.

The hydrogen-generating composition can include both a metal hydride (e.g., an interstitial intermetallic hydride, such as $LaNi_{5-x}Al_x$ wherein x is about 0 to about 1), and a chemical hydride (e.g., an ionic hydride or a covalent hydride, such as magnesium hydride ($MgH_2$), lithium hydride (LiH), aluminum hydride ($AlH_3$), calcium hydride ($CaH_2$), sodium aluminum hydride ($NaAlH_4$), sodium borohydride ($NaBH_4$), lithium aluminum hydride ($LiAlH_4$), ammonia borane ($H_3NBH_3$), diborane ($B_2H_6$), palladium hydride, $LaNi_5H_6$, $TiFeH_2$, and a combination thereof). In some embodiments, the hydrogen-generating composition can include a uniform blend of the chemical hydride, the metal hydride, and the Lewis acid. In some embodiments, the hydrogen-generating composition can include the metal hydride separate from a mixture of the chemical hydride and the Lewis acid, such as a fuel pellet including a metal hydride and a different fuel pellet including an intimate mixture of a chemical hydride and a Lewis acid.

A hydrogen-generating composition including a chemical hydride, a metal hydride, and a Lewis acid can include any suitable proportion of the chemical hydride, such as about 0.5 wt % to about 65 wt %, or about 0.5 wt % or less, or less than, equal to, or greater than about 1 wt %, 2, 3, 4, 5, 10, 15, 20, 25, 30, 35, 40, 45, 50, 55, 60, or about 65 wt % or more. A hydrogen-generating composition including a chemical hydride, a metal hydride, and a Lewis acid can include any suitable proportion of the metal hydride, such as about 20 wt % to about 99.5 wt %, or about 20 wt % or less, or less than, equal to, or greater than about 25 wt %, 30, 35, 40, 45, 50, 55, 60, 65, 70, 75, 80, 85, 90, 95, 96, 97, 98, 99, or about 99.5 wt % or more. A hydrogen-generating composition including a chemical hydride, a metal hydride, and a Lewis acid can include any suitable proportion of the Lewis acid, such as about 0.1 wt % to about 20 wt %, or about 0.1 wt % or less, or less than, equal to, or greater than about 0.5 wt %, 1, 2, 3, 4, 5, 6, 8, 10, 12, 14, 16, 18, or about 20 wt % or more. In one example, a hydrogen-generating composition includes 5 vol % $LaNi_{5-x}Al_x$ wherein x is about 0 to about 1, and is about 60.9 wt % $LaAlH_4$, about 15.2 wt % $ZrCl_4$, and about 23.8 wt % $LaNi_{5-x}Al_x$. In another example, the hydrogen-generating composition includes 95 vol % $LaNi_{5-x}Al_x$ wherein x is about 0 to about 1, and is about 0.7 wt % $LiAlH_4$, about 0.2 wt % $ZrCl_4$, and about 99.1 wt % $LaNi_{5-x}Al_x$.

Lewis Acid.

The hydrogen-generating composition includes one or more Lewis acids. The one or more Lewis acids can form any suitable proportion of the hydrogen-generating composition, such as about 0.001 wt % to about 50 wt % of the hydrogen-generating composition, about 0.1 wt % to about 30 wt %, about 10 wt % to about 30 wt %, about 0.001 wt % or less, or less than, equal to, or greater than about 0.01 wt %, 0.1, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 42, 44, 46, 48, or about 50 wt % or more.

The Lewis acid can be any suitable Lewis acid, such that the hydrogen-generating composition can be used as described herein. The Lewis acid can be an inorganic compound or an organometallic compound in which a cation of the Lewis acid is selected from the group consisting of scandium, titanium, vanadium, chromium, manganese, iron, cobalt, copper, zinc, boron, aluminum, yttrium, zirconium, niobium, molybdenum, cadmium, rhenium, lanthanum, erbium ytterbium, samarium, tantalum, and tin. The anion of the Lewis acid can be a halide. The Lewis acid can be chosen from aluminum chloride ($AlCl_3$), aluminum bromide ($AlBr_3$), aluminum fluoride ($AlF_3$), stannous (II) chloride ($SnCl_2$), stannous (II) bromide ($SnBr_2$), stannous (II) fluoride ($SnF_2$), magnesium chloride ($MgCl_2$), magnesium bromide ($MgBr_2$), magnesium fluoride ($MgF_2$), zirconium (IV) chloride ($ZrCl_4$), zirconium (IV) bromide ($ZrBr_4$), zirconium (IV) fluoride ($ZrF_4$), tungsten (VI) chloride ($WCl_6$), tungsten (VI) bromide ($WBr_6$), tungsten (VI) fluoride ($WF_6$), zinc chloride ($ZnCl$), zinc bromide ($ZnBr_2$), zinc fluoride ($ZnF_2$), ferric (III) chloride ($FeCl_3$), ferric (III) bromide ($FeBr_3$), ferric (III) fluoride ($FeF_3$), vanadium (III) chloride, vanadium (III) bromide, vanadium (III) fluoride, and a combination thereof. The Lewis acid can be chosen from aluminum chloride ($AlCl_3$), magnesium chloride ($MgCl_2$), zirconium (IV) chloride ($ZrCl_4$), and a combination thereof. The Lewis acid can be zirconium (IV) chloride ($ZrCl_4$).

Metal Oxide.

In various embodiments, the hydrogen-generating composition can include one or more metal oxides. In some embodiments, the hydrogen-generating composition can be free of metal oxides. The one or more metal oxides can form any suitable proportion of the hydrogen-generating composition, such as about 0.001 wt % to about 20 wt % of the hydrogen-generating composition, about 1 wt % to about 10 wt %, or about 0.001 wt % or less, or less than, equal to, or greater than about 0.01, 0.1, 1, 2, 3, 4, 5, 6, 7, 8, 9, 10, 12, 14, 16, 18, or about 20 wt % or more.

The metal oxide can be any suitable metal oxide, such that the hydrogen-generating composition can be used as described herein. The metal oxide can be zirconium (IV) oxide, hafnium (IV) oxide, titanium (IV) oxide, or a combination thereof. The metal oxide can be titanium (IV) oxide.

In one embodiment, the fuel pellet comprises a non-fluid, hygroscopic, porous material in pellet form that allows for the diffusion of gases and vapors. When contacted with water molecules, the fuels react, releasing hydrogen gas. The fuel may optionally be combined with a hydrogen generation catalyst to catalyze the reaction of the water vapor and the non-fluid substance. Suitable catalysts may non-exclusively include cobalt, nickel, ruthenium, magnesium and alloys and combinations thereof.

Figure 6:
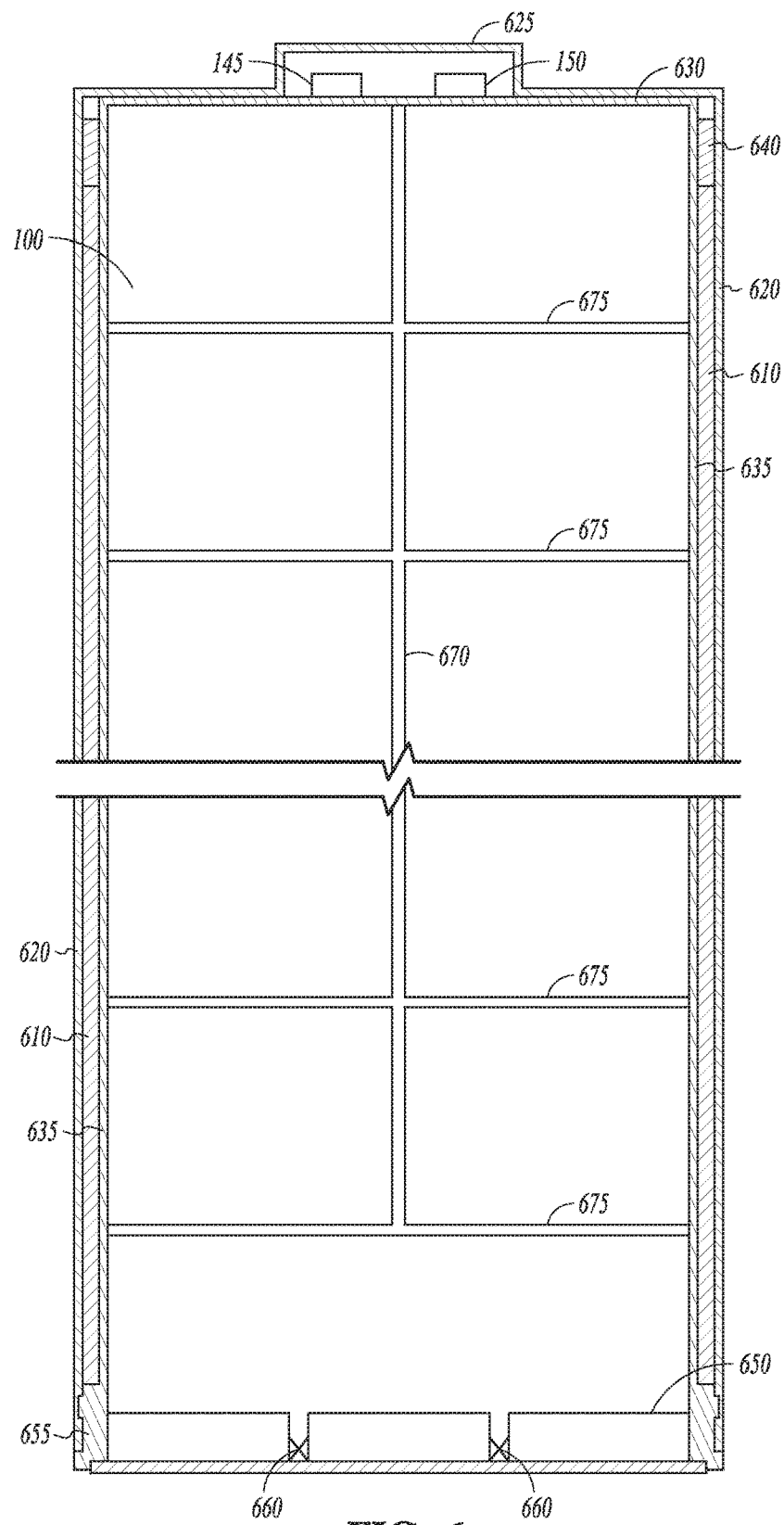
FIG. 6 is a cross section representation of a power generator incorporating a fuel pellet according to an example embodiment.

The fuel pellet 500 may be used in a power generator 600 illustrated in cross section in FIG. 6. A fuel cell stack 610 may be wrapped around the fuel pellet 500 in close thermal contact with the pellet 500. The fuel cell stack 610 may be electrically coupled to a cathode 625 and an anode electrode 630 positioned in desired locations, such as on either end of a can or container 620. Anode electrode 630 may be formed of a conductive material such as Ni, Ni plated steel, or other material in further embodiments. Container 620 may be formed of nickel plated steel in one embodiment, or other suitable material. Container 620 may also contain perforations corresponding to perforations in the fuel cell stack to allow the flow of oxygen and water vapor to ambient. The perforations may be directly aligned with fuel cell stack perforations in one embodiment. Charge storage 145 and electronics 150 may be supported by the container 620 or otherwise in various embodiments, such as proximate the cathode 625.

In one embodiment, the container 620 has a shape adapted to be consistent with desired common battery shapes, such as "AA", "AAA", "C", "D", and other types of cells. The fuel pellet 500 may have a cylindrical shape and also may be adapted to be consistent with the desired shape. Other shapes of containers may also be provided consistent with other battery shapes existing or new battery shapes.

In one embodiment, the fuel cell stack 610 is sandwiched between the anode support 635 and the container 620, which provide a mechanical compression that facilitates good electrical contact between various layers of the fuel cell stack 610. A compression ring 640, such as a nickel ring, may be used to force or compress electrode tabs between various layers of material in the fuel cell stack to connect cells in series. In one embodiment, the compression ring 640 connects a cathode tab of the fuel cell to the container 620, and also may compress a cathode electrode to ensure good electrical contact with a cathode tab. The tabs are shown in further detail below describing the construction of various layers of the fuel cell stack 610.

A plug 650 may be mated with a thicker portion of the anode support as indicated at 655. A threaded connection may be used in one embodiment. One or more valves 660 disposed within the plug 650 may be used to allow preloading of the fuel 500 with hydrogen at an elevated pressure. In further embodiments, the plug may be coupled to the anode support once the fuel has been preloaded. No valves need be used in this embodiment. Anode electrode 630 may then be placed adjacent the plug 655, electrically coupled to the anode support 635 and secured in place to the plug such as by epoxy adhesive or other means.

In some embodiments, the anode electrode 630 may be easily removable to allow access for recharging the fuel 500, either by the use of valves 660, or removal of plug 655. In still further embodiments, a valve may be provided in or proximate to the anode electrode 630 to allow recharging of the fuel 500 without removal of the anode electrode 630. In further embodiments, the fuel 500 may simply be replaced, without recharging.

During initial fueling or refueling, the fuel 500 may be pumped to a low pressure, near a vacuum in some embodiments. This serves to remove gases and potential water vapor from the fuel 500. Then, hydrogen is reloaded into the fuel at a desired pressure, and the fuel is sealed. In one embodiment, the range of operating pressures is between 0.1 and 100 PSI. If the pressure is too low, the cell potential will be low and the cell will operate at reduced efficiency and at low current. If the pressure is too high, excessive hydrogen may leak to ambient, decreasing the total electrical energy that can be generated per charge.

Further details regarding the water vapor permeable, liquid water impermeable material 530 are now provided. The water vapor permeable, liquid water impermeable material 530 may comprise any material having such properties, and includes porous polymer films and fabrics, as well as oils and rubbers. The fuels may be encapsulated using any suitable method which would be appropriate for the chosen encapsulation material, such as wrapping, coating and the like. In one embodiment a layer of a water vapor permeable, liquid water impermeable material is wrapped around the fuel, and optionally the ends of the fuel.

In one embodiment, the water vapor permeable, liquid water impermeable material 530 comprises a micro-porous polymeric film. Such polymeric films non-exclusively include mono- and multilayer fluoropolymer containing materials, a polyurethane containing materials, polyester containing materials or polypropylene containing materials. Suitable fluoropolymer containing materials include polytetrafluoroethylene (PTFE) and expanded polytetrafluoroethylene (ePTFE), PFA, FEP. Example fluoropolymer containing materials are films and fabrics commercially available under the Gore-Tex®, eVent® and HyVent® trademarks. Gore-Tex® is an e-PTFE material commercially available from W.L. Gore and Associates of Newark, Del., and eVENT® is a PTFE material manufactured by BHA technologies of Delaware. HyVent® is polyurethane containing material commercially available from The North Face Apparel Corp., of Wilmington, Del. Of these, ePTFE GORE-TEX® materials are preferred.

Each of these materials may be in the form of single or multilayer films or fabrics, or as coatings, and are known as waterproof, breathable materials. Breathable membranes are typically constructed from a micro-porous layer of expanded PTFE, polyurethane or polypropylene that is laminated to the face of a film such as nylon or polyester. Breathable coatings are typically formed by spreading a thin layer of a micro-porous or hydrophobic polymer directly on the surface of a material, such as the solid fuels of the invention. Breathability is generally measured in two ways. In one method, the water vapor transmission rate of a material may be tested as a rating in grams of how much vapor a square meter, or alternately 100 in$^2$, of fabric will allow to pass through in 24 hours (g/m$^2$/24 hours or g/100 in$^2$/24 hours). Conventional testing methods include the procedures set forth in ASTM E-96 Method B and the procedures set forth in ASTM F1249. The second method is known as Evaporative Resistance of a Textile (RET). The lower the RET, the higher the breathability. i.e. the greater the amount of moisture that will pass through. Based on an ASTM E-96 Method B breathability, rates of 100-10000 g/m$^2$*24 h, 500-2000 g/m$^2$*24 h. and 700-1200 g/m$^2$*24 h. Other rates may also be used, both within the ranges described, and outside of such ranges.

The micro-porous materials generally have a pore size of from about 0.001 μm to about 1 μm in diameter, and a thickness of from about 0.1 μm to about 100 μm. The porosity and thickness of the materials can be tailored to give a desired water vapor flux, while preventing liquid water penetration. In one embodiment, the films or fabrics have a pore size consistent with obtaining a desired overall moisture permeability. In some embodiments, the pore size may range from about 0.01 μm to about 5 μm. Larger or smaller pore sizes may be utilized in conjunction with other design parameters to obtain a desired overall moisture permeability.

In another embodiment, the water vapor permeable, liquid water impermeable material comprises a micro-porous oil or rubber coating. In one embodiment, a hydrophobic material is used that soaks into the pellet, preventing rapid release of hydrogen if the pellet is damaged and the interior is exposed to liquid water. Such materials may include PTFE dispersions and other materials such as oils that may soak into a pellet, preventing rapid release of hydrogen if the pellet is damaged and exposed to liquid water. Oils may non-exclusively include mineral oil, petroleum based oils consisting primarily of saturated hydrocarbons, oily solvents such as xylene, paraffin wax. Such rubbers non-exclusively include curable rubber, isoprene, silicone, polyurethane, neoprene, and fluoropolyether based rubbers. Any conventional coating method may be used to encapsulate the fuel with a micro-porous oil or rubber coating. For example, a fuel may be mixed with an oil or rubber solution, a solvent and a curing agent to form a blend, which blend is warmed and stirred to a desired consistency, granulated, dried and optionally pelletized. Suitable solvents for forming an oil or rubber solution non-exclusively include ketones such as methyl ethyl ketone, methyl isobutyl ketone, ethers, and ester. Suitable curing agents non-exclusively include organosilanes containing at lease one isocyanate group. Such blends may be formed in a suitable vessel at a temperature of from about 0° C. to about 1000° C., or from about 20° C. to about 500° C., and dried for from about 1 to about 24 hours. Other granulation and pellet forming techniques may also be used.

Similar to the films described above, the porosity and thickness of the oil or rubber coating materials can be tailored to give a desired water vapor flux, while preventing liquid water penetration. In one embodiment, the oil or rubber coating materials have a pore size of from about 0.001 μm to about 1 μm, or from about 0.01 μm to about 0.5 μm, or from about 0.05 μm to about 0.1 μm. Further, in one embodiment, the oil or rubber coating materials have a thickness of from about 0.01 μm to about 10 μm, or from about 0.05 μm to about 5 μm, or from about 0.1 μm to about 1 μm.

While the fuels described are particularly well suited for use in a power generator apparatus, the encapsulated fuels may be used with virtually any type of power generator device that is designed to utilize in-situ generated hydrogen gas.

In one embodiment, a plurality of bores may be provided in fuel pellet 500 as shown in FIG. 6. A vertical bore 670 along the axis is formed in one embodiment. Further vertical bores may be formed if desired. Horizontal bores 675 are also illustrated. Bores may also be formed on angles between those shown in further embodiments. Single or multiple bores at the same or different angles may be utilized in various embodiments. Selected bores may also contain metal hydride in various embodiments.

Manufacturing a Fuel Cell Stack

In one embodiment, a fuel cell stack, such as fuel cell stack 610 may be manufactured as a thin film. It may be less than one mm thick in some embodiments, and flexible such that it is conformable to many different shapes. Multiple layers of the fuel cell stack 610 may be rolled or otherwise stacked together, and result in a flexible film that can be bent around the fuel or valves for ease of manufacture. The following layers are described for use in a cylindrical battery shape. Other layouts of layers may be used to form different shapes. The example layouts provide for the formation to two fuel cells coupled in series.

Figure 7:
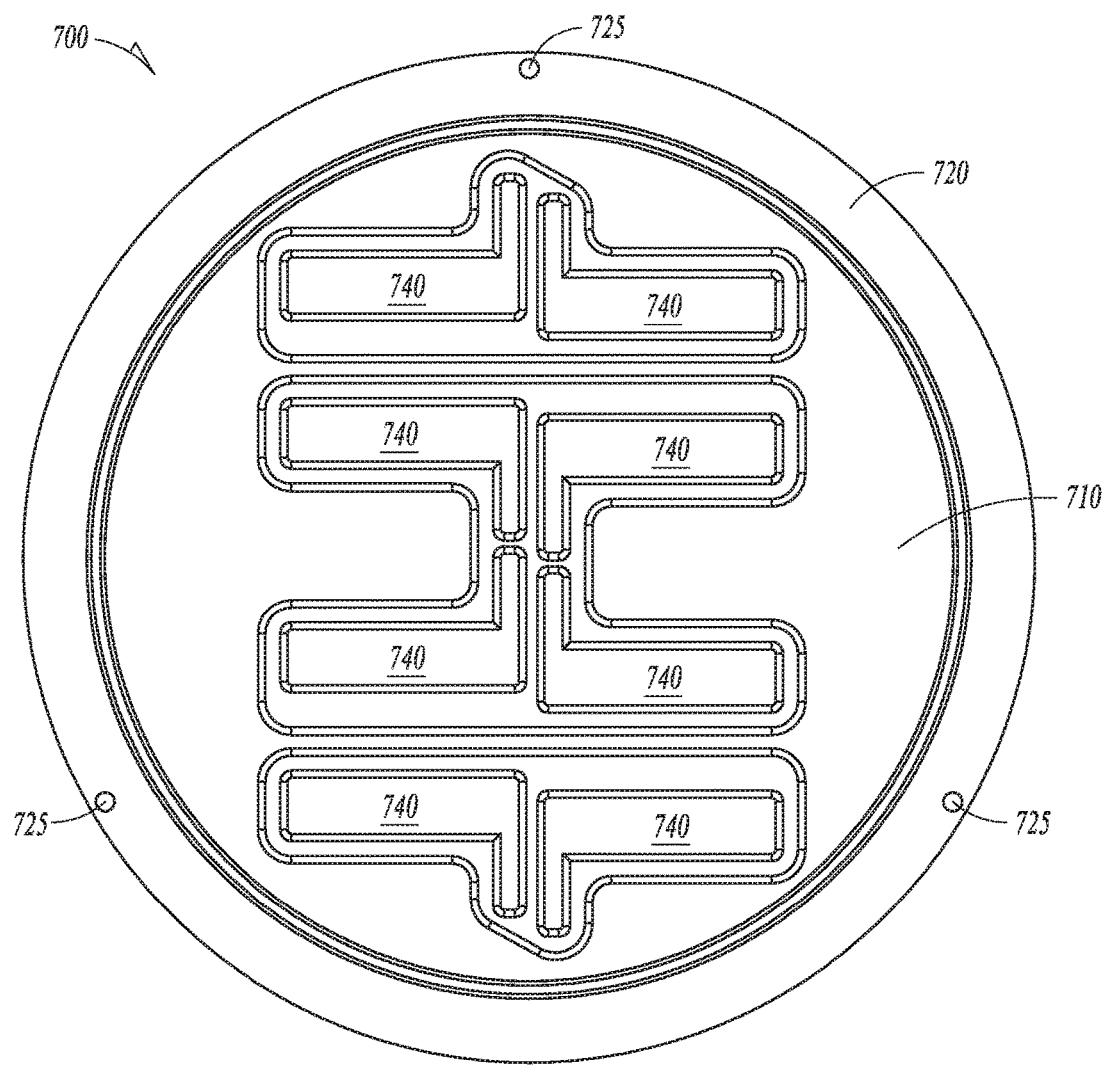
FIG. 7 is a top view of an anode mask according to an example embodiment.

The formation of the individual layers in the fuel cell stack will now be described, followed by an expanded view illustrating how the layers are assembled and used in a power generator. To form the anode electrode, an anode mask 700 in FIG. 7 may be used in one embodiment. A polymer substrate 710, such as KAPTON, or PET is taughtly supported by a ring 720. The ring 720 contains registration or alignment devices such as pins 725 to allow precise positioning of the ring 720. The mask 700 has multiple openings 740 to allow deposition of metal through the mask openings 740 forming four pairs of anodes in this example.

Figure 8:
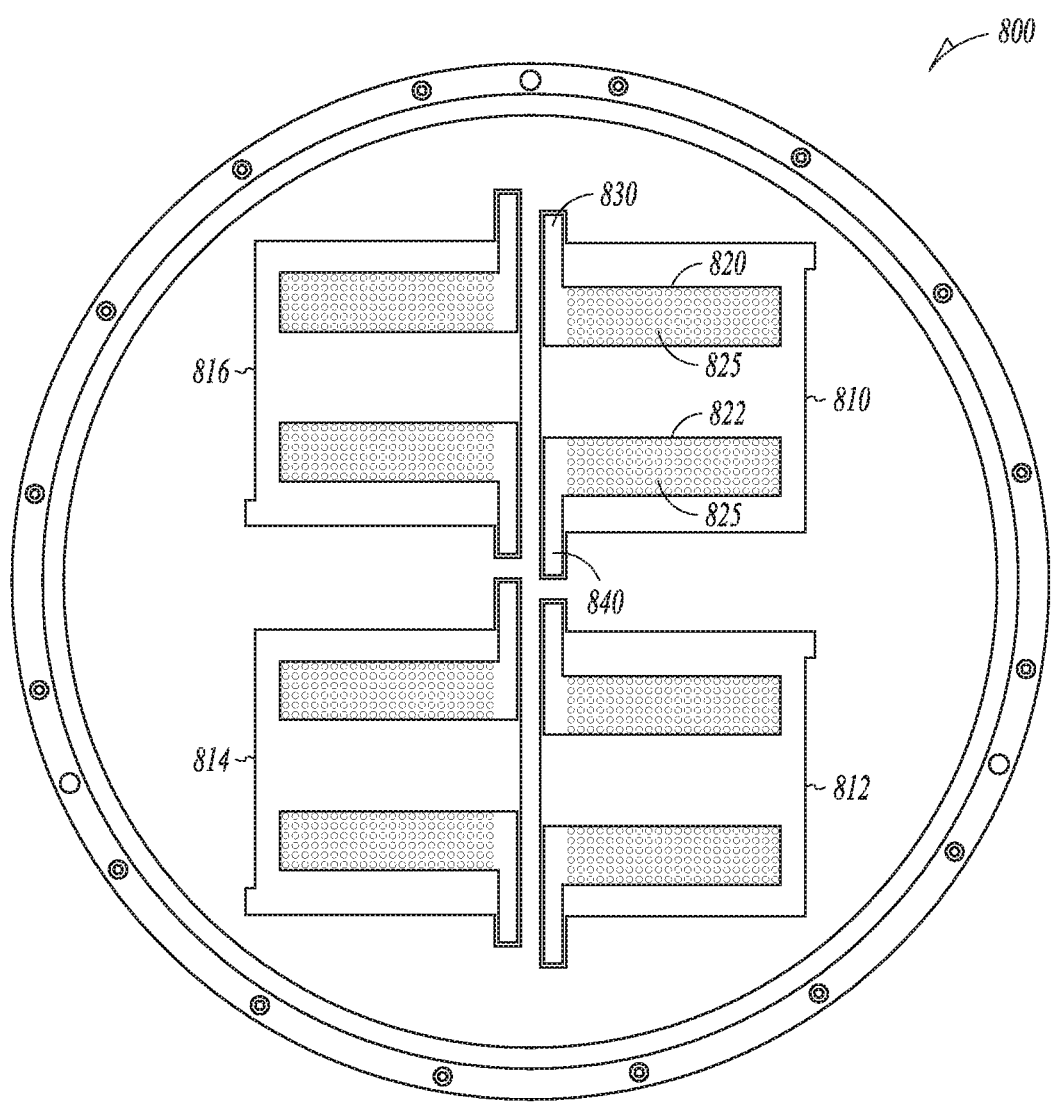
FIG. 8 is an illustration of multiple patterned anodes having holes according to an example embodiment.

Metal may be deposited such as by evaporation through the mask 600 onto a 2 mil thick PET layer in one embodiment. A typical metallization process may include an ion mill to clean the PET surface, followed by a deposition of a few hundred angstrom (200-300 in one embodiment) of a Ti and/or Al adhesion layer, followed by 1-2 microns of Au (gold). Other conductive materials may be used, but it is desirable that they be highly conductive and corrosion resistant. Many other processes may be used for forming the conductive layer or layers of the anode. After deposition, the mask 700 is lifted, and a laser may be used to cut individual patterns 7810, 812, 814 and 816 as shown in FIG. 8. Each pattern contains two anodes 820, 822 that have laser cut holes 825 to allow for gas diffusion through the electrode. Each anode also has a tab 830 in this embodiment, allowing for a series electrical connection of the two fuel cells when the fuel cell stack is conformed to a desired shape, such as a cylinder.

Figure 9:
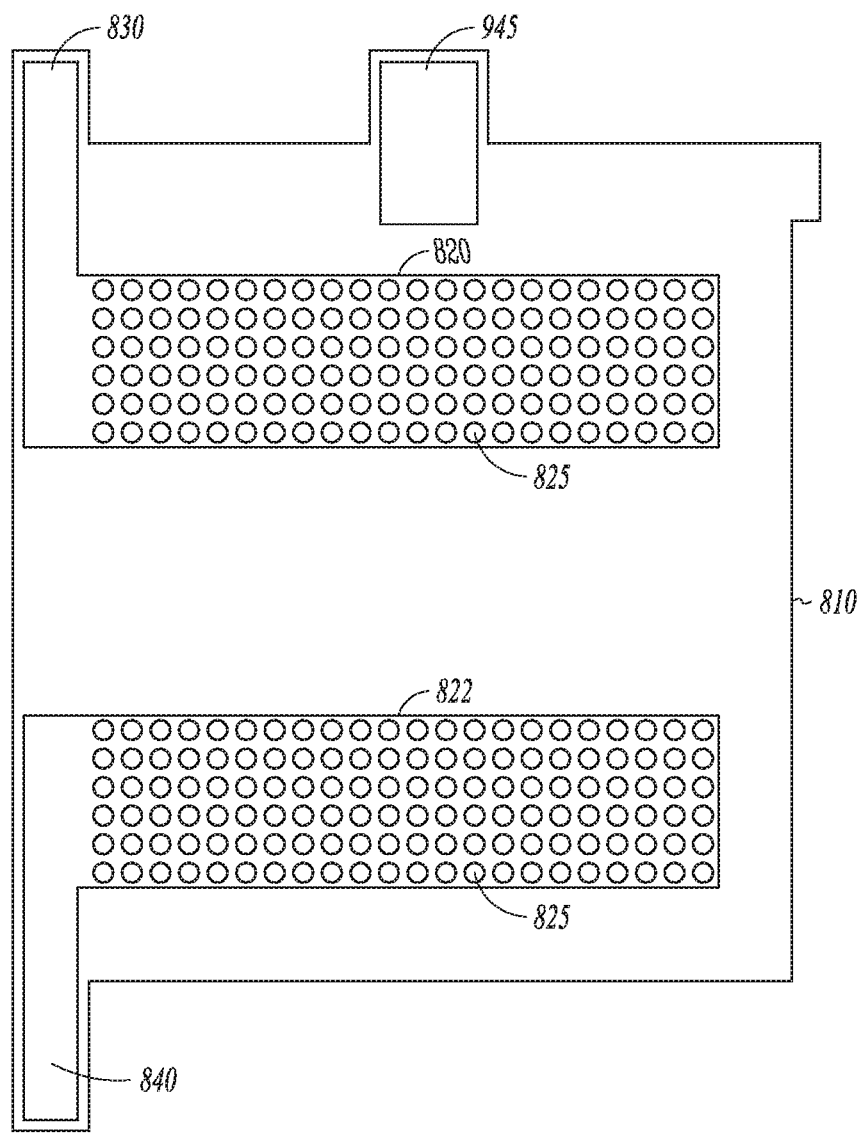
FIG. 9 is a blown up view of a pattern of FIG. 8 according to an example embodiment.

FIG. 9 is a blown up view of pattern 810, illustrating electrodes 820 and 822 in larger form. In one embodiment, one side of the pattern 810 may have an adhesive thereon for adhering to an anode support. In one embodiment, the pattern is 2 mil thick PET with 1 mil adhesive, 200 A Ti, and 1 um Au. An extended contact 945 may be provided to make contact with ring 720 when the layers are assembled.

Figure 10:
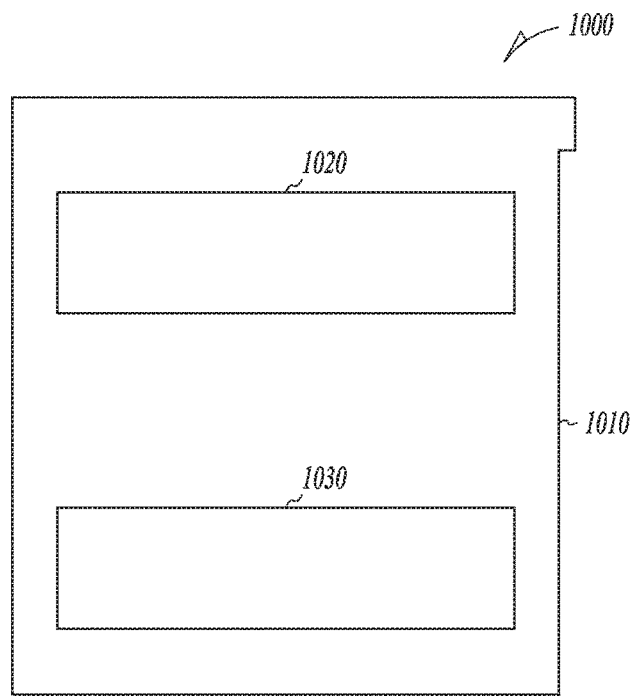
FIG. 10 illustrates an adhesive layer with an anode gas diffusion layer according to an example embodiment.

FIG. 10 illustrates an adhesive layer 1000 with an anode gas diffusion layer. An alignment tab 1010 is provided in a desired location to facilitate alignment with other layers. Adhesive layer 1000 has openings 1020 and 1030 corresponding to the anodes 820 and 822. In one embodiment, the adhesive layer may be 2 mil thick Kapton with 1 mil adhesive on each side, with total thickness of 4 mils. The thickness may vary considerably if desired and is approximately 0.1 mm thick in a further embodiment. Openings 1020 and 1030 further comprise gas diffusion layers, such as 4 to 6 mil thick carbon paper in one embodiment.

Figure 11:
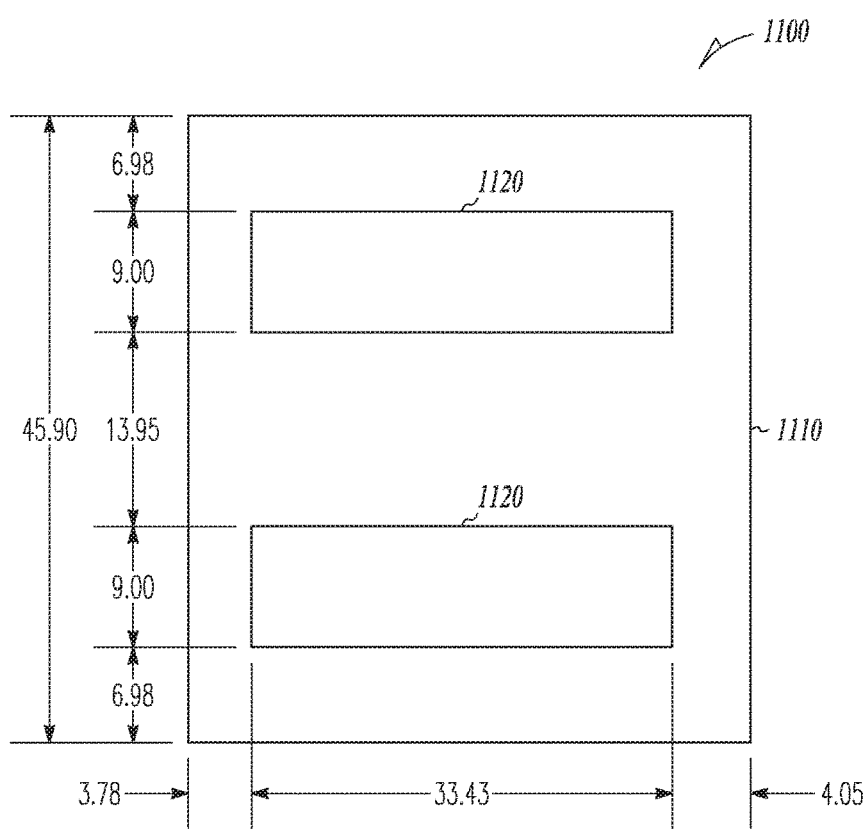
FIG. 11 represents an ion exchange membrane layer according to an example embodiment.

An ion exchange membrane layer is illustrated in FIG. 11 at 1100. In one embodiment, a frame 1110 of Kapton is used to support Nafion membranes 1115 and 1120. Membranes 1115 and 1120 are positioned to align with 1020, 1030 and anodes 820 and 822 when assembled. The membranes 1120 and 1115 may be 1 mil thick Nafion NRE211 with 0.5 mg/cm$^2$ of carbon supported platinum electrodes. Different thicknesses of membranes and other layers may be used in further embodiments consistent with retaining a desired flexibility for the fuel cell stack. In one embodiment, two cells are being formed with the multiple layers that will be coupled in series when assembled.

Figure 12:
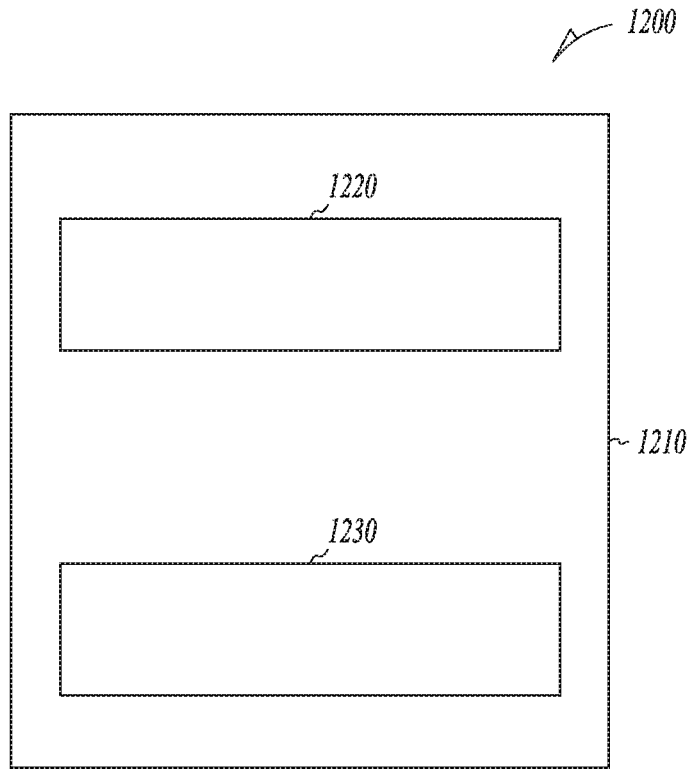
FIG. 12 represents a double sided adhesive layer including a gas diffusion layer for a cathode layer according to an example embodiment.

FIG. 12 at 1200 represents a double sided adhesive layer including a gas diffusion layer for the cathode layer. It may be similar to that shown at 1000 in FIG. 10, including two openings 1220 and 1230 for alignment with the cathodes in the next layer. In one embodiment, the adhesive layer may be 2 mil thick Kapton with 1 mil adhesive on each side, with total thickness of 4 mils. The thickness may very considerably if desired and is approximately 0.1 mm thick in a further embodiment. Openings 1220 and 1230 further comprise gas diffusion layers, such as 4 to 6 mil thick carbon paper in one embodiment.

Figure 13:
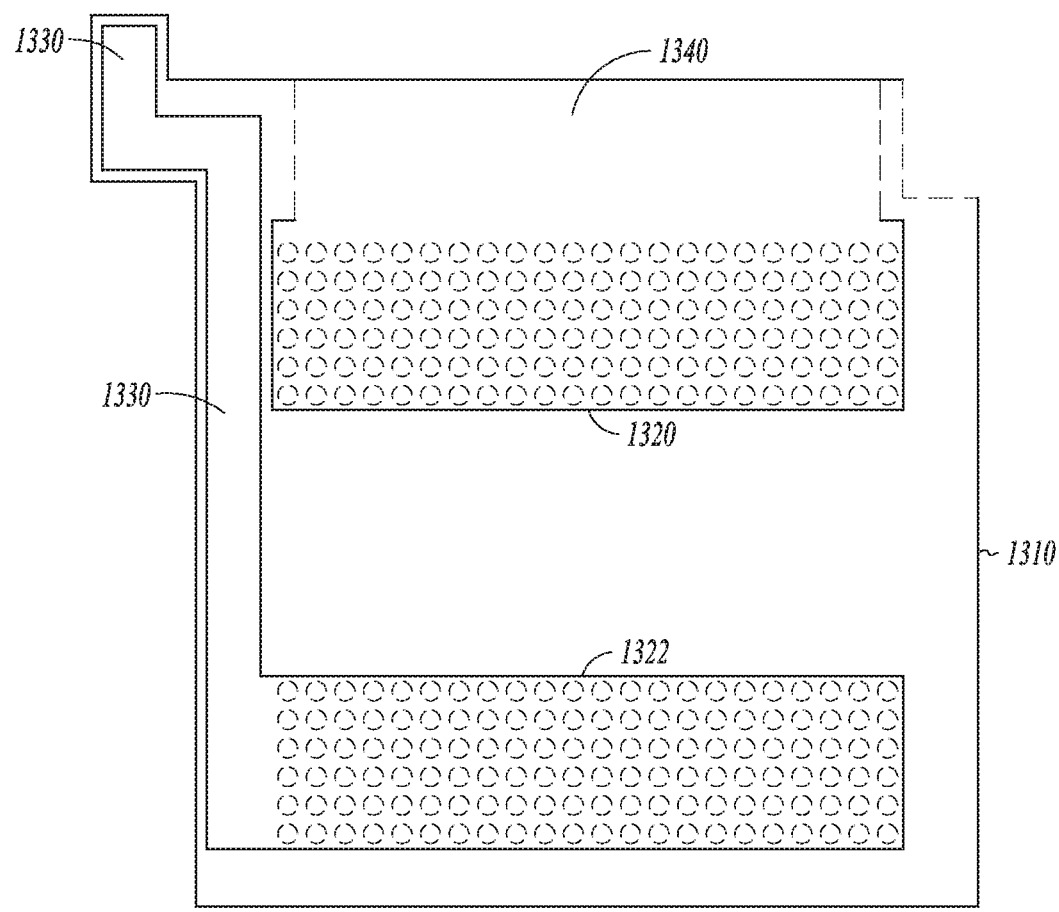
FIG. 13 illustrates a cathode pattern having electrodes with holes according to an example embodiment.
Figure 14:
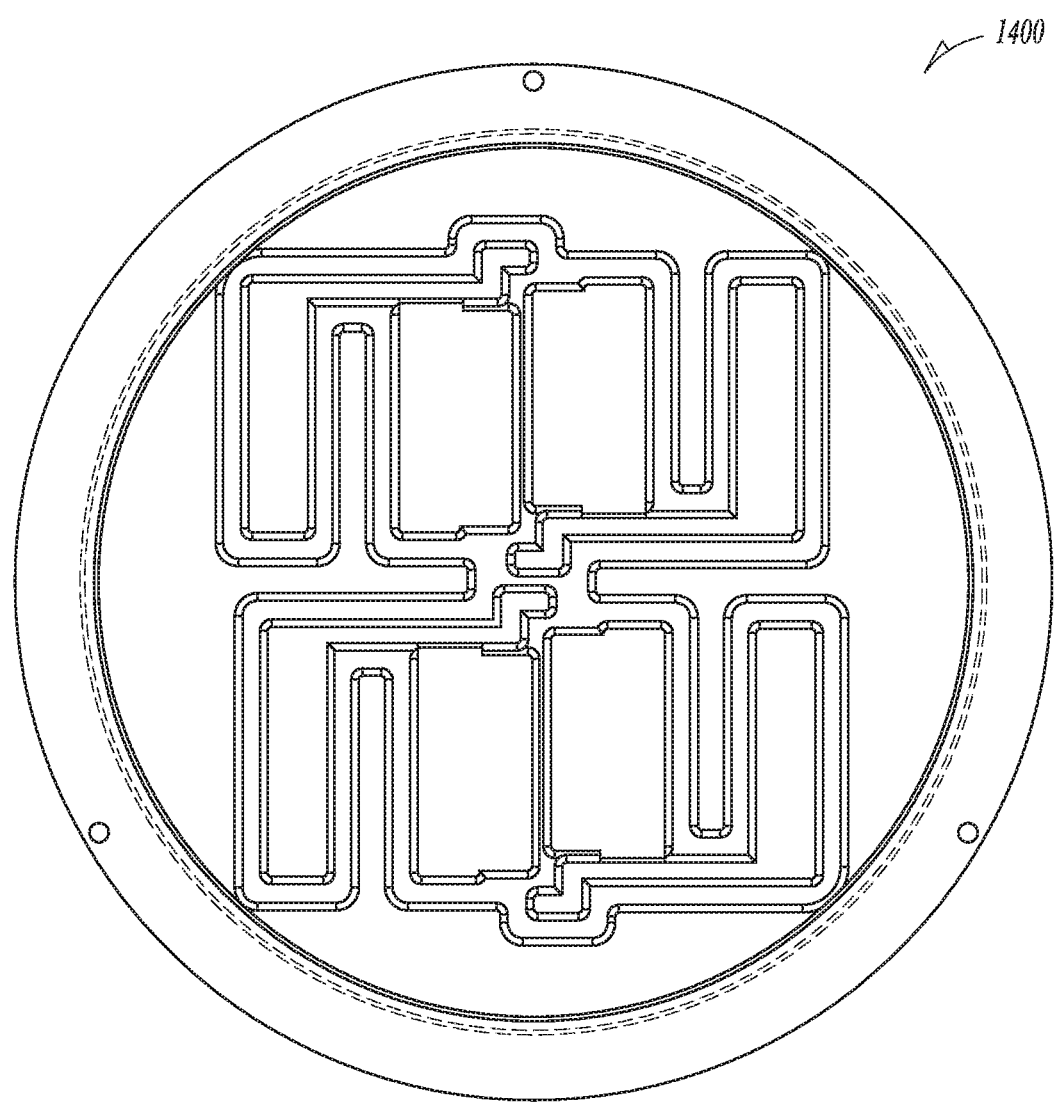
FIG. 14 illustrates an anode mask according to an example embodiment.
Figure 15:
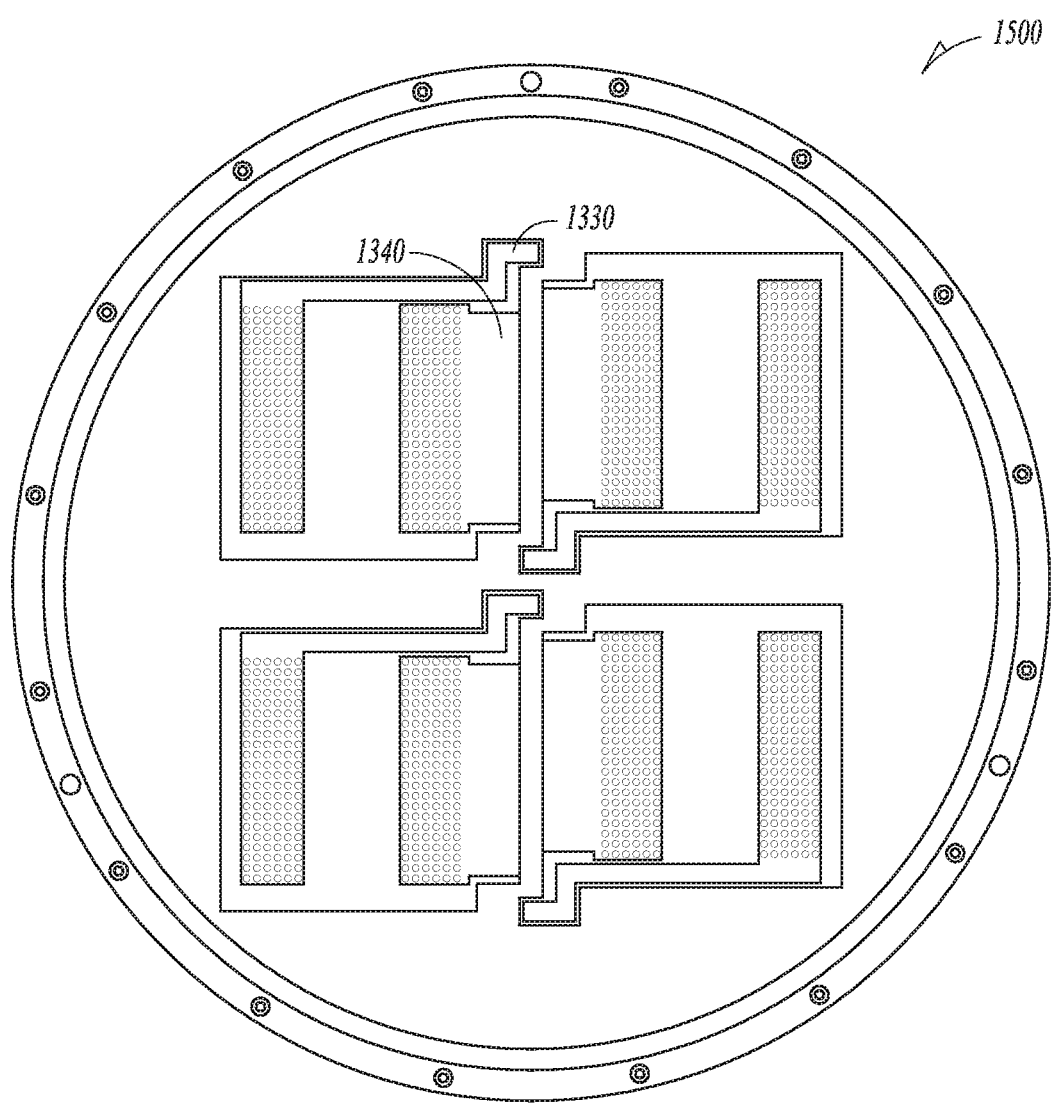
FIG. 15 illustrates multiple anode patterns using the mask of FIG. 13 according to an example embodiment.

FIG. 13 illustrates a cathode pattern 1310 having electrodes 1320 and 1322 shown with holes similar to those in the anodes described earlier. In one embodiment, the pattern is 2 mil thick PET with 1 mil adhesive, 200 A Ti, and 1 um Au. A connector 1330 is shown facilitating coupling of the resulting fuel cells in series. Pattern 1310 may be formed in the same manner as the anode pattern using mask shown at 1400 in FIG. 14, resulting in multiple patterns which are laser cut with holes and cut into separate patters in FIG. 15 at 1500.

Figure 16:
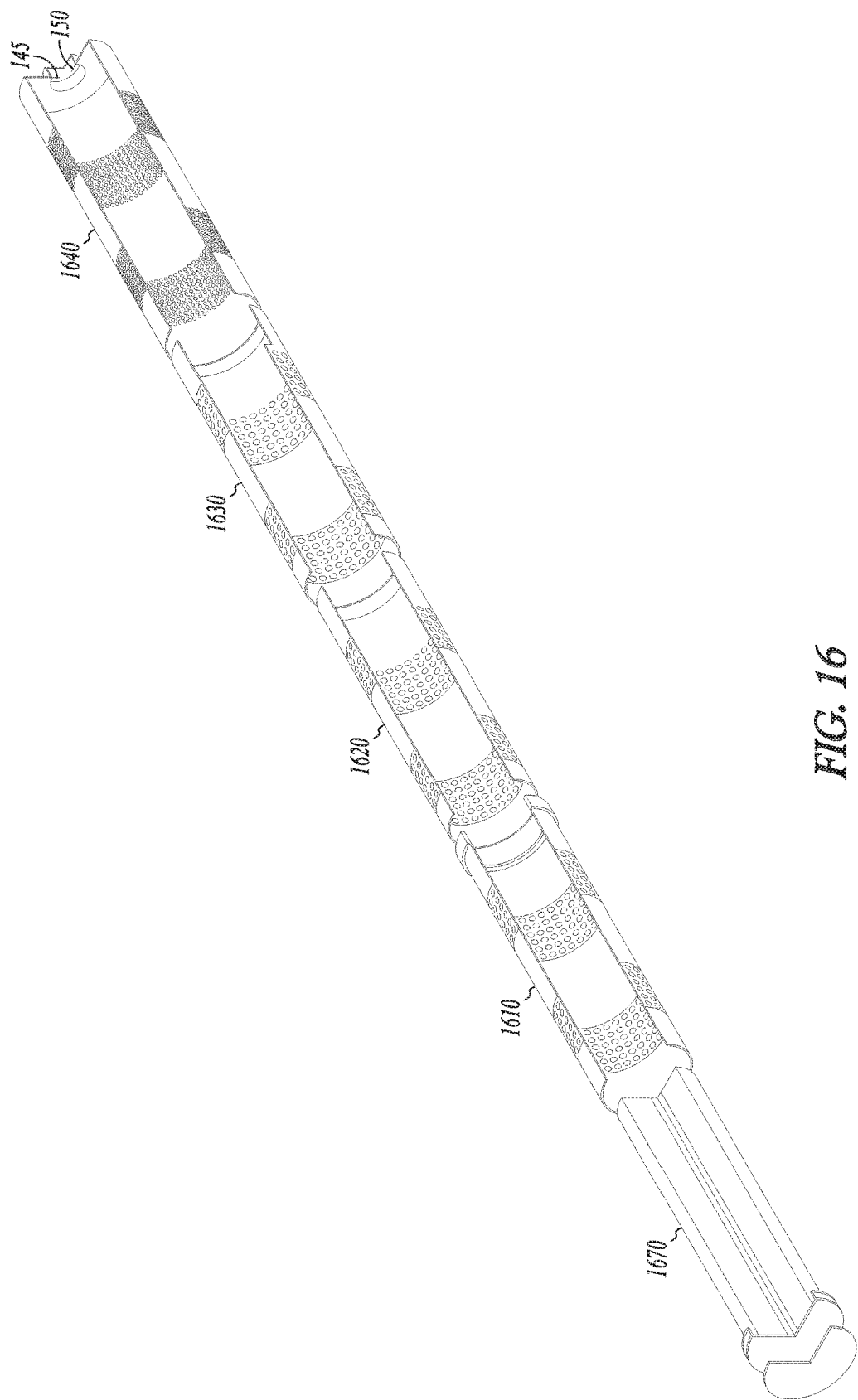
FIG. 16 is an exploded perspective view of a fuel cell stack according to an example embodiment.

The layers of the fuel cell stack described above may be assembled in many different ways. In one embodiment, individual layers may be rolled one by one onto an anode support using a dual roller fixture. In a further embodiment, the layers may be stacked on a planar surface, and then rolled as a stack onto an anode support 1610 as illustrated in FIG. 16, which is an exploded perspective view of a fuel cell stack and power generator according to an example embodiment.

In one embodiment, the order of the fuel cell stack layers is as described above, starting with the anode electrode layer 1620, the adhesive and anode gas diffusion layer, the membrane, the adhesive and cathode gas diffusion layer, followed by the cathode electrode 1630. The anode support 1610 is a rigid cylinder on which the anode electrode is adhered, and supports the stack and compresses it to a specified degree against the inside of container 220.

The resulting two cells are electrically coupled in series in one embodiment by virtue of the electrode designs. Tab 830 on anode 820 and tab 1330 on cathode 1322 are electrically connected. A tab 1340 electrically connects cathode 1320 to anode support 1610. Tab 1340 also connects to the ring 240 and via the ring to contact 1045. The ring provides compression to ensure the electrical contact is good. Container 220 is electrically connected to compression ring 240 and functions as the cathode terminal of the power generator. Tab 840 is connected electrically to anode plate 230 which functions as the anode terminal of the power generator. The anode support 1610, with the fuel cell stack layers adhered to it is inserted over the fuel and membrane 1670. FIG. 16 illustrates an efficient and convenient method by which a power generator may be assembled. Charge storage 145 and electronics 150 may be supported by the container 220 or otherwise in various embodiments.

Examples

In example 1, a power source includes a container, a hydrogen fuel disposed within the container, a fuel cell wrapped around the hydrogen fuel within the container, electronics supported within the container and coupled to receive current from the fuel cell, a sensor coupled to the electronics to provide data representative of a sensed condition, and a charge storage device within the container and coupled to provide current to the electronics.

Example 2 includes the power source of example 1 wherein the hydrogen fuel comprises a chemical hydride and a metal hydride and wherein the charge storage device is configured to provide current when current demand of the electronics exceeds that providable by the fuel cell.

Example 3 includes the power source of example 2 wherein the metal hydride absorbs hydrogen responsive to excess production of hydrogen by the chemical hydride, and provides hydrogen responsive to the current demand of the electronics exceeding that providable by the fuel cell responsive to hydrogen from the chemical hydride.

Example 4 includes the power source of example 3 wherein the chemical hydride is shaped in a cylinder, and the metal hydride is disposed within the cylinder.

Example 5 includes the power source of example 4 wherein the container is in the shape of a AA battery form factor.

Example 6 includes the power source of example 5 and further comprising a cathode and anode coupled to the fuel cell.

Example 7 includes the power source of any of examples 1-6 wherein the electronics comprises a transmitter with antenna.

Example 8 includes the power source of example 7 wherein at least one sensor comprises a voltage sensor coupled to measure a voltage produced by the fuel cell.

Example 9 includes the power source of any of examples 7-8 wherein the at least one sensor comprises an environmental condition sensor.

Example 10 includes the power source of example 9 wherein the environmental condition includes at least one of temperature, relative humidity, position, velocity, pressure, vibration, and altitude of a device in which the power source is embedded.

In example 11, a power source includes a container having a cathode and an anode, a hydrogen fuel disposed within the container, a fuel cell wrapped around the hydrogen fuel within the container wherein the fuel cell is coupled to the cathode and anode, a controller supported within the container and coupled to receive current from the fuel cell, a sensor coupled to the electronics to provide data representative of a sensed condition, a wireless transmitter coupled to the controller to transmit the data, and a charge storage device within the container and coupled to provide current to the controller and transmitter.

Example 12 includes the power source of example 11 wherein the hydrogen fuel comprises a chemical hydride and a metal hydride and wherein the metal hydride absorbs hydrogen responsive to excess production of hydrogen by the chemical hydride, and provides hydrogen responsive to the current demand of the electronics exceeding that providable by the fuel cell responsive to hydrogen from the chemical hydride, and wherein the charge storage device is configured to provide current when current demand of the electronics exceeds that providable by the fuel cell.

Example 13 includes the power source of example 12 wherein the container is in the shape of a AA battery form factor.

Example 14 includes the power source of any of examples 12-13 wherein the sensor comprises a voltage sensor coupled to measure a voltage produced by the fuel cell and an environmental condition sensor.

Example 15 includes the power source of example 14 wherein the environmental condition includes at least one of temperature, relative humidity, position, velocity, pressure, vibration, and altitude of a device in which the power source is embedded.

In example 16, a method includes receiving electrical current at electronics integrated into a power source container, the current generated substantially via a fuel cell receiving hydrogen from a chemical hydride within the power source container, receiving data from at least one sensor representative of a voltage produced by the fuel cell, storing excess hydrogen generated from the chemical hydride in a metal hydride within the power source container, receiving electrical current from the fuel cell that receive hydrogen from the metal hydride when a current demand exceeds a level sustainable by hydrogen from the chemical hydride, and receiving electrical current from a charge storage device within the power source container when a current demand exceeds a level sustainable by hydrogen from the chemical hydride and metal hydride.

Example 17 includes the method of example 16 wherein the container is in the shape of a AA battery form factor.

Example 18 includes the method of any of examples 16-17 and further comprising providing current outside the power source container via a cathode and anode coupled to the fuel cell.

Example 19 includes the method of any of examples 16-18 wherein the integrated electronics comprises at least one sensor and a transmitter with antenna having current demands in a transmit mode exceeding the current providable by the fuel cell.

Example 20 includes the method of example 19 and further including wirelessly transmitting the received data.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

The invention claimed is:

1. A power source comprising:
a container;
a hydrogen fuel disposed within the container;
a fuel cell wrapped around the hydrogen fuel within the container;
electronics supported within the container and coupled to receive current from the fuel cell;
a sensor coupled to the electronics to provide data representative of a sensed condition; and
a charge storage device within the container and coupled to provide current to the electronics.

2. The power source of claim 1 wherein the hydrogen fuel comprises a chemical hydride and a metal hydride and wherein the charge storage device is configured to provide current when current demand of the electronics exceeds that providable by the fuel cell.

3. The power source of claim 2 wherein the metal hydride absorbs hydrogen responsive to excess production of hydrogen by the chemical hydride, and provides hydrogen responsive to the current demand of the electronics exceeding that providable by the fuel cell responsive to hydrogen from the chemical hydride.

4. The power source of claim 3 wherein the chemical hydride is shaped in a cylinder, and the metal hydride is disposed within the cylinder.

5. The power source of claim 4 wherein the container is in the shape of a AA battery form factor.

6. The power source of claim 5 and further comprising a cathode and anode coupled to the fuel cell.

7. The power source of claim 1 wherein the electronics comprises a transmitter with antenna.

8. The power source of claim 1 wherein the sensor comprises a voltage sensor coupled to measure a voltage produced by the fuel cell.

9. The power source of claim 1 wherein the sensor comprises an environmental condition sensor.

10. The power source of claim 9 wherein the environmental condition includes at least one of temperature, relative humidity, position, velocity, pressure, vibration, and altitude of a device in which the power source is embedded.

11. A power source comprising:
a container having a cathode and an anode;
a hydrogen fuel disposed within the container;
a fuel cell wrapped around the hydrogen fuel within the container wherein the fuel cell is coupled to the cathode and anode;
a controller supported within the container and coupled to receive current from the fuel cell;
a sensor coupled to electronics to provide data representative of a sensed condition;
a wireless transmitter coupled to the controller to transmit the data; and
a charge storage device within the container and coupled to provide current to the controller and transmitter.

12. The power source of claim 11 wherein the hydrogen fuel comprises a chemical hydride and a metal hydride, and wherein the metal hydride absorbs hydrogen responsive to excess production of hydrogen by the chemical hydride, and provides hydrogen responsive to the current demand of the electronics exceeding that providable by the fuel cell responsive to hydrogen from the chemical hydride, and wherein the charge storage device is configured to provide current when current demand of the electronics exceeds that providable by the fuel cell.

13. The power source of claim 12 wherein the container is in the shape of a AA battery.

14. The power source of claim 12 wherein the sensor comprises a voltage sensor coupled to measure a voltage produced by the fuel cell and an environmental condition sensor.

15. The power source of claim 14 wherein the environmental condition includes at least one of temperature, relative humidity, position, velocity, pressure, vibration, and altitude of a device in which the power source is embedded.

* * * * *